United States Patent Office 3,531,424
Patented Sept. 29, 1970

3,531,424
SILICONE-CONTAINING ROOM-TEMPERATURE
VULCANIZING COMPOSITIONS
Gerald Bradley Swanson, Adrian, Mich., assignor, by
mesne assignments, to Stauffer-Wacker Silicone Corporation, a corporation of Delaware
No Drawing. Continuation of application Ser. No. 576,528, Sept. 1, 1966. This application Aug. 21, 1969, Ser. No. 853,608
Int. Cl. C08f 19/14
U.S. Cl. 260—18                                            12 Claims

ABSTRACT OF THE DISCLOSURE

A room-temperature vulcanizing composition based on a hydroxy-organopolysiloxane having an organic group grafted to at least one silicon atom through an alkylene group. This organic group is constituted of recurring units derived from unsaturated organic compounds. The composition incorporates a metal salt of a high molecular weight fatty acid, e.g., stearic acid, as a reinforcing and flow-control agent.

---

This is a continuation of Ser. No. 576,528, filed Sept. 1, 1966, now abandoned.

This invention relates to silicone compositions of the type generally classified as room-temperature curing or vulcanizing compositions.

As exemplary of such compositions may be noted the disclosure of Berridge patent U.S. 2,843,555 and that of U.S. Patent 3,035,016 to Leonard B. Bruner. The identified patents respectively illustrate a "two-component" and a "one-component" room-temperature vulcanizing (RTV) system. These systems are distinguished in that the one-component system, unlike the two-component system, does not require addition of a catalyst at the work site to bring about the curing. In either case, the composition is based on an organopolysiloxane fluid of linear structure having terminal hydroxyl groups each of which is bonded to a silicon atom.

The Berridge composition includes as a necessary ingredient a cross-linking agent, specifically ethyl silicate, which on addition of the catalyst reacts with the terminal hydroxy groups to form reactive sites leading to condensation and cross-linking of the organopolysiloxane molecules—this being the mechanism of the cure. Bruner, on the other hand, converts the terminal hydroxy groups of the silicone material to acyloxy radicals which on use of the composition hydrolyze from the effect of ambient moisture to create such sites.

In general, the two-component or two-packages system is employed in commercial establishments where precise measuring equipment is available and adequate control over processing procedures is possible. The one-component system is especially applicable where considerable variation in cure time is permissible. Also, it is manifestly advantageous in situations where the available labor is unskilled and any weighing and mixing operations are consequently best avoided.

The compositions discussed supra are reinforced with selected inorganic fillers, the filler normally consisting of or comprising specially processed, finely divided silica. As reinforced, they have been employed commercially in various applications. Thus, they have been used for caulking and in the preparation of molds. Also, they have been found useful in the insulation of electrical components by encapsulation and in the fabrication of dielectric gasket materials and cushioning devices. Additionally, they have been employed as sealants for joints between adjacent sections of concrete highways, their rubber-like character in the cured form adapting them for the expansion and contraction of such sections occurring with sudden extremes of temperature. In this highway application, the reinforced sealing material, instead of being directly applied to the joint, is added to a fibrous carrier having generally the form of a rope which is forced between the adjacent concrete sections.

The compositions of the present invention differ from the prior art in that the organopolysiloxane material on which they are based, in addition to comprising terminal OH groups or terminal groups hydrolyzable by ambient moisture, carries at least one organic group linked to the organopolysiloxane backbone through an aliphatic carbon atom forming a part of such backbone. This organic group may be derived via any suitable grafting procedure from a single unsaturated compound or a plurality of such compounds.

The compositions herein further differ in that they are filled in whole or in part with a material of organic as opposed to inorganic derivation.

These compositions answer fully to the principal object of the invention, which is to provide compositions exhibiting improved flow characteristics and less tendency to migrate or slump when laid down, with the development of areas of non-uniform section.

The fillers which have been found to contribute these improvements are the water-insoluble metal salts of the "fatty acids," by which is meant the acids which occur most frequently in fats as glycerol esters, i.e. palmitic, stearic, and oleic acids.

From the foregoing, it is to be understood that a composition according with the present invention comprises an organopolysiloxane of the character described above, the same being reinforced with a filler consisting of or comprising predominately a water-insoluble metal salt of a fatty acid.

It is to be understood that a composition as just defined, when the same contains terminal hydroxyl groups, is intended for use with a catalyst, whereas no catalyst is contemplated if the terminal groups are of themselves hydrolyzable by ambient moisture.

The grafting operation providing the base material employed herein is most expeditiously effected using a free-radical initiator, normally a peroxide. As little as 0.05 percent of the more active peroxide initiators (on the weight of the reactants) is adequate in most cases. Higher levels increase the reaction rate and as much as 2 percent or even more of the initiator sometimes may be used. However, it is advisable as a general rule not to exceed 1.0 percent since higher concentrations tend to promote coupling reactions, undesirably increasing the viscosity of the reaction mixture.

Using a free-radical initiator, the reaction when carried out batch-wise generally proceeds at a satisfactory rate if the temperature is maintained in the area of 60° C. to 130° C. If a continuous process is employed, or if the reaction is carried out batch-wise without a free-radical initiator, substantially higher temperatures, i.e. upwards of 190° C., may be advantageous.

The most suitable peroxide initiators are those in which at least one of the peroxide oxygens is attached to a tertiary carbon atom. As exemplary of these may be mentioned: dialkyl peroxides, such as di-t-butyl and dicumyl peroxide; hydroperoxides such as t-butyl hydroperoxide, cumene hydroperoxide and decalin hydroperoxide; cyclic peroxides such as ascaridole and 1,5-dimethylhexane-1,5-peroxide; and peresters such as t-butyl perbenzoate, t-butylperoxy isopropyl carbonate and t-butyl peroctoate. Ketone peroxides such as acetone peroxide and cyclohexanone peroxide are also applicable.

Acyl peroxides and peracids may be used in the preparation of the base material, but in general they result in less grafting, i.e. poorer yields of the grafted product. The difference is believed to lie in the nature of the radicals produced. Thus, tertiary alkoxy radicals from di-tertiary-butyl peroxide, for example, have a strong tendency to abstract hydrogen atoms, and this is a necessary step in grafting. On the other hand, acyloxy radicals produced from an acyl peroxide, e.g. benzoyl peroxide, while effective polymerization initiators are relatively ineffective hydrogen abstractors.

Although it may be possible to carry out the grafting using organopolysiloxane material free of terminal hydroxy groups or group hydrolyzable by ambient moisture and to subsequently treat the graft polymer to incorporate such groups, it is preferred in the grafting operation to start with an organopolysiloxane having terminal hydroxy groups. Following this practice, where a one-component RTV composition is desired, the graft polymer following the grafting is appropriately treated to convert the hydroxyl groups to groups hydrolyzable by ambient moisture.

Contrary to representations made in the literature it has been discovered that hydroxyl groups, at least when they are in terminal position, are unaffected by the grafting reaction.

The hydroxy organopolysiloxane material used in the grafting operation may contain in minor proportion molecules having only one hydroxyl group or there may be a small number of molecules present carrying in excess of two hydroxyl groups. It is preferred, in any event, that the hydroxy organopolysiloxane material average out to from 1.75 to 2.25 hydroxyl groups per molecule.

The chain length of the siloxane is important, although grafting has been found to occur with siloxanes of almost any length. If the siloxane material predominates in molecules of short chain length many of these will remain unreacted. On the other hand, very long chain material results in a grafted product that is extremely viscous and difficult to manage in some applications. In general, hydroxy polysiloxanes with a degree of polymerization between 100 and 1,000 are recommended. This is equivalent to a viscosity between about 100 and 30,000 centipoises. Most preferably, the viscosity of the hydroxy siloxane material lies within the range 200 to 4,000 centiposies. Where an easily pourable graft product is desired, as for a sealant application, optimum results are usually achieved in the lower portion of such ranges, i.e. 300 to 500 centipoises.

The hydroxy-organopolysiloxanes preferred for use in the preparation of the base material are represented by the formula

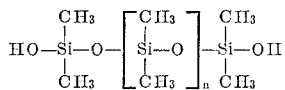

in which $n$, as indicated supra, has a value between 100 and 1,000.

The invention may, of course, be practiced using a base material comprising low molecular weight aliphatic groups other than methyl. In any case, the material may comprise aryl groups up to a maximum of 25 percent; indeed in some instances the presence of aromatic groups may be advantageous.

The proportion of organic monomer or monomers used in the grafting reaction may be varied within wide limits. However, the more significant improvements in physical properties vis-a-vis the prior art compositions have been attained where the reaction mixture has comprised from 25 to 75 percent by weight organic monomer or monomers. Most preferably, the organic monomer portion accounts for from 40 to 65 percent of the total weight of the reactants.

Organic monomers which are applicable to the preparation of the grafted hydroxy organopolysiloxane base are many and varied. They include vinyl halides as vinyl chloride and vinyl fluoride; vinyl esters of organic acids as vinyl acetate, styrene, ring substituted styrenes and other vinyl aromatics such as vinyl-pyridine and vinyl-naphthalene; acrylic acid and derivatives of acrylic acid, including the salts, esters, amides and acrylonitrile; N-vinyl compounds such as vinylcarbazole, N-vinylpyrrolidone and N-vinylcaprolactam; and vinylsilicon compounds such as vinyltriethoxysilane.

Disubstituted ethylenes of the type $CH_2=CX_2$ also may be used—including vinylidene fluoride, isopropenyl acetate, vinylidene cyanide, vinylidene chloride and compounds derived from or related to methacrylic acid, including the salts, esters and amides, as well as methacrolein and methacrylonitrile.

Applicable disubstitute ethylenes of the type

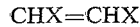

comprise vinylene carbonate and various monomers that polymerize best in the presence of others monomers, e.g. maleic anhydride, stilbene, indene and coumarone.

As before emphasized, the monomers may be used singly or in combinations of two or three or even more. The properties of the graft product, of course, depend on the nature and identity of the monomer material as well as on the amounts used relative to the hydroxy-organopolysiloxane. Monomers that give elastomeric homopolymers generally provide elastomeric graft products while those that give plastic homopolymers tend to yield graft products which are less elastic. By using at least one monomer from each class, graft products can be obtained meeting requirements which the prior compositions cannot approach. Particularly excellent results have been achieved in this connection through the employment of styrene and substituted styrenes in conjunction with acrylates and methacrylates. Following are examples of styrene-acrylate combinations which have been successfully graft polymerized with hydroxy-terminated polydimethylsiloxanes:

Styrene-butyl acrylate
Styrene-butyl-methacrylate
Styrene-butyl acrylate-acrylonitrile
Styrene-acrylic acid
Styrene-2-ethylhexyl acrylate
Styrene-2-ethylhexyl acrylate-butyl acrylate
Styrene-ethyl methacrylate
Styrene-butyl acrylate-acrylamide
Styrene-butyl acrylate-maleic anhydride
Styrene-butyl acrylate-acrylic acid
Styrene-isobutyl methacrylate Where a combination of monomers as above is employed, the relative proportion of each monomer is, of course, determined as previously suggested by the characteristics desired in the cured composition. In general, compositions with a desirable balance of properties result when the ratio of acrylate to styrene or other vinyl aromatic is in the range 1:3 to 3:1 on a weight basis.

When the invention herein is applied as a one-package system the required cross-linking during curing may be attained by adding to the graft product before the packaging operation a silane of the general formula $XSiY_3$, where X is a relatively inert group as alkyl, alkoxy, or aryl and Y is a group as acyloxy, oximo, dialkylaminooxy and the like, readily hydrolyzable by ambient moisture. Exemplary of such silanes are methyltriacetoxy-silane, isopropoxytriacetoxysilane, methyltriacetoximosilane, methyl-tris diethylaminooxysilane, etc.

Following the usual procedure, the cross-linking agent is added to the graft product after the same has been filled with the selected metal salt of a fatty acid. The conversion of the terminal hydroxyl groups carried by the graft product to acyloxy groups begins immediately, but may be completed in the package before the package reaches the ultimate consumer.

If it is desired to apply the invention to a two-package system, the cross-linking of the filled grafted product may be provided for by incorporating in the package with the graft polymer a polyalkoxysilane or a polyalkoxysiloxane. The polyalkoxy compound, e.g. ethyl orthosilicate or a partially hydrolyzed ethyl silicate as "Ethyl Silicate 40," which is approximately decaethyl tetrasilicate, is best used in proportions of from about 0.5 to about 5 percent by weight on the graft product.

The second package of the two-package system, of course, contains the catalyst which is desirably a tin compound, e.g. dibutyltindilaurate, dibutyltin butoxychloride, etc. The amount of catalyst used is determined by the cure rate desired. Usually, the catalyst is employed in proportions within the range 0.1 to 1 percent on the weight of the graft product-cross linked mixture.

The following equations illustrate the chemistry believed to be involved in the curing of compositions prepared according to the invention. Equations I are directed to the graft product as prepared to contain groups hydrolyzable by ambient moisture while Equations II have relation to the curing as effected with a cross-linking agent and catalyst.

(I)

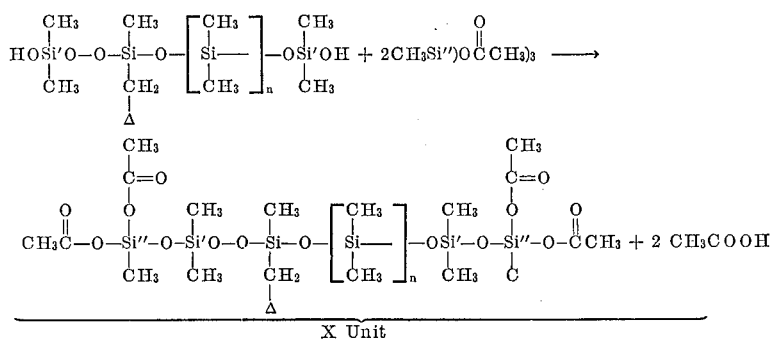

X units+$H_2O$ (atmospheric)→ cross-linked network structure+$CH_3COOH$ Δ=organic polymeric segment (II)

tates, and oleates comprising any of the metals barium, calcium, zinc, aluminum, and lithium. Of these, the preferred filler is lithium stearate.

These metal salts, as will be subsequently demonstrated, markedly reinforce the composition even when employed in amounts which are relatively small compared to the quantities of inorganic fillers customarily used in the reinforcement of silicone elastomers. At the same time they markedly improve the flow and "slump" characteristics, which in practical effect means that the compositions are more readily applied than the prior materials, yet when deposited even on a vertical surface show little tendency to sag.

The invention does not preclude the employment of other filler material along with the fatty acid metal salt, but the latter must be present in an amount equivalent to not less than about 5 percent of the weight of the organopolysiloxane if an advantage is to be gained from the invention. The upper limit on the metal salt is subject to a number of variables, particularly the viscosity of the siloxane, but in general it is inadvisable to employ the salt in an amount greater than 25 percent of the weight of the siloxane.

Other fillers employed may be reinforcing or nonsurface area precipitated silicas, silica aerogels and the like. The coarser silicas, as diatomaceous earths and crushed quartz, are examples of nonreinforcing filler materials having application. In this connection, metallic oxides as titanium oxide, ferric oxide, zinc oxide, etc. also should be noted. Applicable fibrous fillers include asbestos and fibrous glass.

Considering the effect of moisture on the one-component compositions herein, it is manifestly important that the filler material be dry when admixed with the graft product.

Apart from the filler component, compositions conforming to the invention may contain stabilizers, coloring agents, agents capable of preventing the passage of ultraviolet light, desiccants and antioxidants, for instance. Also, depending upon the use to which the composition is to be put, it may or may not be desirable or necessary to include a conductive material—graphite for example.

Compositions conforming to the invention can be tailored to fit various specifications as to cure times. In mold-making, for instance, the working time from the pot using a two-component system is more or less conventionally calculated as of the order of 2–2½ hours. Thus, to meet this requirement, the materials used in the preparation of the composition are so selected and proportionated that substantial stiffening of the composition will not occur until after expiration of such period of time.

The composition, prepared as a one-component system as for caulking, is normally applied from the tube, hence working time is of little moment. Normally, the caulking is tack-free within ½ to 3 hours, is substantially cured after 24 hours and completely cured after 7 days. These periods, of course, vary somewhat as to any given composition with changes in humidity and also with changes in temperature. In general, the higher the temperature and humidity the faster the cure.

The compositions herein, assuming proper packaging, show an excellent shelf-like, which is to say that they can be stored for prolonged periods of time without adverse effect.

Detailed aspects of the invention are illustrated by the following examples which are not to be taken as in any way limitative of the scope thereof:

EXAMPLE I

Four parts by weight of an hydroxy-terminated polydimethylsiloxane having a viscosity of 450 cs. (25° C.) and 6 parts by weight of a 50:50 mixture of styrene and butyl acrylate were charged to a jacketed stainless steel reactor provided with a stirrer. Following the addition of a catalytic amount of t-butylperoxide, the mixture was heated for 6 hours at 125° C., whereafter the unreacted monomers were removed by vacuum distillation. The yield of graft product was approximately 95 percent.

EXAMPLE II

Three grams of methyl triacetoxy silane were added to each of three 100 gram samples of the product of Example I. Prior to the addition of the silane to samples B and C, the same were filled respectively with 19 grams of a conventional silica filler and 8 grams lithium stearate.

|  | A (no filler) | B | C |
|---|---|---|---|
| Tensile: |  |  |  |
| 2 day cure | 359 |  | 716 |
| 7 day cure | 353 | 588 | 650 |
| Percent Elongation (Instrom): |  |  |  |
| 2 day cure | 401 |  | 593 |
| 7 day cure | 404 | 513 | 557 |
| Tear (lbs./in.): |  |  |  |
| 2 day cure | 58 |  | 71 |
| 7 day cure | 55 | 61 | 67 |
| Shore A Hardness: |  |  |  |
| 2 day cure | 63 |  | 49 |
| 7 day cure | 65 | 66 | 63 |

EXAMPLE III

A sample of graft polymer produced in accordance with Example I and filled with 10 parts lithium stearate was immediately packaged in a tube following addition of the methyl triacetoxy silane. Several days later the flow characteristics of the material were tested by placing a portion of the sample in an air gun having an ⅛ in. orifice through which the material was forced under 90 lbs. pressure. Under these conditions the flow rate was determined to be 780 gallons per minute.

In a "slump" test, there was employed a steel test piece formed to provide a channel 6 in. long, ½ in. deep, and ¾ in. wide. This channel was filled flush throughout its length with material from the tube and the test piece thereafter maintained in a position such that the channel was disposed vertically. After two hours, there was no observable slumping of the material in the channel.

When the same slump test was applied to silica-filled samples, otherwise identical, it was found necessary in order to avoid slumping to use the filler in such quantities that the flow rate by the above described air gun method became practically nil.

EXAMPLE IV

A soft polymer, such as is desirable for certain applications, was prepared as follows:

Six parts by weight of a 40:55:5 mixture of butyl acrylate, ethyl acrylate and styrene and four parts by weight of an hydroxy-terminated polydimethylsiloxane having a viscosity of 400 cs. (25° C.) were charged to the reactor along with a catalytic amount of peroxide catalyst. The mixture was maintained at a temperature of 125° C. with stirring for a 12 hour period, whereafter the unreacted monomers were removed under reduced pressure. The viscous graft product was subsequently treated with methyl triacetoxy silane employed in an amount equivalent to 3 percent of the weight of the polymer. Following a 7 day cure the values below were obtained:

Tensile _____ 58
Percent elongation _____ 194
Tear _____ 17
Shore A Hardness _____ 24
Modulus (pull force required for 100% elongation) _____ 45

When the polymer was filled with 10 parts of lithium stearate per 100 parts of the polymer, the tensile was increased to 109, the percent elongation to 424, and the tear to 23, while the hardness and modulus remained essentially unaffected.

EXAMPLE V

The experiment of Example IV was repeated except that in place of the butyl acrylate-ethyl acrylate-styrene mixture there was used a 70:10:20 mixture of ethyl acrylate, styrene, and 2-ethyl hexyl acrylate. After a 7 day cure the following values were obtained:

|  | Unfilled graft polymer | Filled graft polymer (8 pts. lithium stearate per 100 pts. graft polymer) |
|---|---|---|
| Tensile | 61 | 177 |
| Percent Elongation | 285 | 545 |
| Tear (lb./in.) | 13 | 17 |
| Shore A Hardness | 19 | 20 |
| Modulus | 35 | 41 |

EXAMPLE VI

The experiment of Example IV was again repeated with the substitution of an organic moiety made up of 60 parts butyl acrylate, 30 parts ethyl acrylate, and 10 parts styrene. The values after a 7 day cure were as follows:

|  | Unfilled graft polymer | Filled graft polymer (8½ pts. lithium stearate per 100 pts. graft polymer) |
|---|---|---|
| Tensile | 62 | 138 |
| Percent Elongation | 206 | 448 |
| Tear (lb./in.) | 11 | 18 |
| Shore A Hardness | 17 | 20 |
| Modulus | 32 | 44 |

EXAMPLE VII

To a one-liter flask were added 125 grams of styrene, 102 grams of butyl acrylate, 152 grams of 610 cs. hydroxy-terminated polydimethylsiloxane and 1.1 grams of t-butyl peroxide. The mixture was heated to 125° C. and stirred at 280 r.p.m. for 24 hours. The residual monomers were removed at 125° C. under reduced pressure. The product at this point was a white opaque liquid having a viscosity of 14,500 cs. It was well grafted, as shown by extraction with acetone. After three extractions only about 2 percent of acetone-insoluble material remained, representing unreacted siloxane. Evaporation of volatile material showed that 97.8 percent of the organic monomers had reacted.

To a 100-gram sample of the graft product was added with stirring 10 grams of lithium stearate, 1 gram of "Ethyl Silicate 40", and 0.5 gram of dibutyltin butoxychloride. On curing, the improvements following from the use of the lithium stearate in lieu of conventional inorganic fillers are of the same magnitude as indicated in Example II, supra.

EXAMPLE VIII

The procedures of Examples I and II were repeated using an hydroxy-terminated polydimethylsiloxane of 400 cs. viscosity and substituting barium stearate for the lithium stearate. The results were as follows after a 7 day cure:

|  | Unfilled graft polymer | Filled graft polymer (8½ pts. barium stearate per 100 pts. graft polymer) |
|---|---|---|
| Tensile | 479 | 606 |
| Percent Elongation | 475 | 593 |
| Tear | 41 | 63 |
| Shore A Hardness | 61 | 62 |
| Modulus | 81 | 101 |

EXAMPLE IX

The experiment of Example VIII was repeated with the substitution of calcium stearate for barium stearate. The Tensile and Elongation were again substantially improved with relatively little effect on the other values.

The invention claimed is:

1. A room-temperature vulcanizing composition comprising an organopolysiloxane and at least about 5 percent by weight based on the weight of organosiloxane of a metallic salt of an acid wherein the metals are selected from the group consisting of barium, calcium, zinc, aluminum, and lithium and the acid is selected from the group consisting of stearic, palmitic and oleic acids; said organopolysiloxane having terminal silicon bonded groups selected from the class consisting of hydroxyl groups and groups hydrolyzable by ambient moisture and being characterized in that the organic portion of said organopolysiloxane consists predominately of lower alkyl groups in which at least one of said alkyl groups has been modified by having an organic polymer grafted thereto; said polymer being constituted of recurring units derived from monomers containing ethylentic unsaturation; said monomers being selected from the class consisting of straight chain olefins whether or not attached to an aromatic nucleus, halogenated olefins again whether or not attached to an aromatic nucleus, unsaturated acids, esters of organic acids in which either the esterifying group or the derivative acid is unsaturated, unsaturated amides and unsaturated nitriles; and when said organopolysiloxane contains terminal hydroxyl groups, the composition includes a tin catalyst and a cross-linking agent selected from the class consisting of polyalkoxysilanes and polyalkoxysiloxanes.

2. A composition as defined by claim 1 where the metal salt is present in an amount within the range 5 to 25 percent on the weight of the hydroxy-organopolysiloxane.

3. A composition as defined by claim 1 where the grafted hydroxy-organopolysiloxane has a viscosity of from about 100 to about 30,000 centipoises.

4. A composition according to claim 1 when the metal salt is lithium stearate.

5. A composition according to claim 4 when the viscosity of the grafted hydroxy-organopolysiloxane lies within the range 200–400 centipoises.

6. A composition according to claim 1 when the polymeric group is derived from styrene and one or more acrylates.

7. A one-component room-temperature vulcanizing composition comprising an organopolysiloxane and at least about 5 percent by weight based on the weight of organosiloxane of a metallic salt of an acid wherein the metals are selected from the group consisting of barium, calcium, zinc, aluminum, and lithium and the acid is selected from the group consisting of stearic, palmitic, and oleic acids; and a silane of the formula $X-SiY_3$ in which Y is an organic group readily hydrolyzable by ambient moisture and X is a relatively inert group; said organopolysiloxane having terminal bonded hydroxyl groups and being characterized in that the organic portion of said organopolysiloxane consists predominately of lower alkyl groups in which at least one of said alkyl groups has been modified by having an organic polymer grafted thereto; said polymer being constituted of recurring units derived from monomers containing ethylenic unsaturation, said monomers being selected from the class consisting of straight chain olefins whether or not attached to an aromatic nucleus halogenated olefins again whether or not attached to an aromatic nucleus, unsaturated acids, esters of organic acids in which either the esterifying group or the derivative acid is unsaturated, unsaturated amides and unsaturated nitriles.

8. A composition conforming to claim 1 when the cross-linking agent is a form of ethyl silicate.

9. A composition in accordance with claim 7 when the metal salt is lithium stearate.

10. A composition conforming to claim 9 when the viscosity of the grafted hydroxy-organopolysiloxane is of the order of from 300 to 500 centipoises.

11. A composition conforming to claim 7 when the polymeric group is derived from styrene and butyl acrylate.

12. A composition conforming to claim 7 wherein the silane is methyltriacetoxysilane.

References Cited

UNITED STATES PATENTS 2,843,555 7/1958 Berridge _____ 260—18
3,065,194 11/1962 Nitzsche et al. _____ 260—37
3,133,891 5/1964 Ceyzeriat _____ 260—18

DONALD E. CZAJA, Primary Examiner

M. I. MARQUIS, Assistant Examiner

U.S. Cl. X.R.

260—37, 46.5, 825, 827